United States Patent [19]
Young

[11] Patent Number: 5,836,428
[45] Date of Patent: Nov. 17, 1998

[54] BRAKE SHOE ASSEMBLY HAVING BRAKE LINING RETAINER MEMBERS

[75] Inventor: Gordon Young, Brantford, Canada

[73] Assignee: Rome Tool & Die Co., Rome, Ga.

[21] Appl. No.: 847,818

[22] Filed: Apr. 28, 1997

[51] Int. Cl.$^6$ .................................................. F16D 69/04
[52] U.S. Cl. .................................. 188/250 G; 72/379.2; 188/250 B; 188/250 A; 228/136; 29/458
[58] Field of Search ................................ 188/250 A, 245, 188/246, 250 B, 250 G, 250 F, 258, 234–248, 250 C, 250 H, 250 D, 250 R, 250 E, 73.1; 72/379.2; 29/458; 228/136; 192/107 R, 107 T

[56] References Cited

U.S. PATENT DOCUMENTS

| | | | |
|---|---|---|---|
| 130,734 | 8/1872 | McAlister . | |
| 478,671 | 7/1892 | Wharton . | |
| 553,470 | 1/1896 | Jeffrey . | |
| 1,520,701 | 12/1924 | Down | 188/234 |
| 1,561,701 | 11/1925 | Down | 188/234 |
| 1,561,704 | 11/1925 | Down | 188/234 |
| 1,796,433 | 3/1931 | Blume | 188/250 G |
| 2,161,363 | 6/1939 | Malcolm . | |
| 2,791,299 | 5/1957 | Bonkowski | 188/234 |
| 2,835,367 | 5/1958 | Steck | 188/234 |
| 3,064,769 | 11/1962 | Billmeyer | 188/234 |
| 4,360,959 | 11/1982 | Johannesen | 188/250 C |
| 5,255,762 | 10/1993 | Beri | 188/250 G |
| 5,261,512 | 11/1993 | Young | 188/250 B |
| 5,636,717 | 6/1997 | Cardenas | 188/250 G |

*Primary Examiner*—Douglas C. Butler
*Attorney, Agent, or Firm*—Thomas, Kayden, Horstemeyer & Risley

[57] ABSTRACT

A brake shoe assembly including retainer members which aid in retaining the brake shoe lining in position on the brake shoe table. The retaining members include distal flanges which abut beveled distal edges of the brake shoe lining and a central wedge which, when tightened to the brake shoe table, forces the brake shoe lining plates outwardly and into the distal flanges, holding the brake shoe lining plates in compression between the central wedge and the distal flanges.

5 Claims, 2 Drawing Sheets

BRAKE SHOE ASSEMBLY HAVING BRAKE LINING RETAINER MEMBERS

FIELD OF THE INVENTION

The present invention generally relates to brake shoes for the wheels of vehicles such as cars, trucks, and the like. More particularly, the present invention relates to a brake shoe assembly having brake lining retainers positioned on the brake shoe table for retaining the brake lining in proper alignment on the brake shoe table and for further protecting the distal edges of the brake lining against stress-related fracture.

BACKGROUND OF THE INVENTION

Brake shoe assemblies of vehicles such as automobiles, trucks, buses, and the like, are subjected to extreme forces during braking operations. Accordingly, brake assemblies and their constituent components must be specially designed to withstand the high heat and stresses created during braking. In particular, the brake linings must be mounted in a manner which protects against lining detachment. Currently, it is conventional to attach brake linings to brake shoe tables by riveting, bolting, or bonding. Of these three methods of attachment, bonding is preferred since the lining, if bonded, does not need to be provided with holes to accommodate rivets or bolts. The absence of such holes improves braking performance in two ways. First, not having holes increases the lining contact area which increases the amount of friction that may be created between the lining and the brake drum, thus increasing stopping power. Second, rivet holes tend to accumulate debris which can decrease braking performance by reducing the friction which may be created. Without these holes, no such debris can accumulate.

A problem with bonding that remains, however, is that bonded brake shoe linings have a tendency to shear-off in the direction of rotation of the wheel drum. Although the linings are not likely to sheer-off when properly bonded to the brake shoe table, it is often difficult to achieve a perfect bond between the lining and the table. Since the conventional brake shoe linings used today are typically formed from high strength, substantially rigid materials rather than the relatively flexible asbestos material formerly used in the industry, modern linings are difficult to precisely mate with the attachment surface of the brake shoe table. Gaps between the lining and the table can lead to cracks which enable moisture to penetrate the bond, rust the brake table, and ultimately cause premature brake failure. Indeed, even in situations in which water does not rust the table, the large shear forces applied to the lining during braking can act upon even slight gaps to cause detachment of the lining.

The bonding process also presents manufacturing drawbacks. In particular, the bonding procedure requires a long period of time to complete. Typically, when brake linings are bonded to a brake shoe table, the bonding material is first applied to the attachment surface of the table and the lining is then clamped into place. Once clamped, the entire assembly is slowly brought up to a high temperature to cure the bonding material. After remaining at temperature for a predetermined period of time, the assembly is then slowly cooled to room temperature. If the brake assembly is cooled too quickly, cracks can form in the bonding material resulting in a defective brake assembly. Accordingly, conventional bonded brake shoe assemblies are both time and labor intensive.

Despite these potential drawbacks, bonding is still very attractive because of the increased braking power which it can provide. In addition, since brake shoe assemblies typically are left unprotected from the elements, bonding, when properly performed, can reduce brake table rusting, thereby extending the useful life of the brake assembly.

Accordingly, it can be seen that it is desirable to bond brake linings to brake shoe tables. It can further be seen that, given the tendency of bonded brake linings to separate from the brake shoe table, it would be desirable to provide a brake shoe assembly having means for retaining the bonded brake shoe linings on the brake shoe table.

SUMMARY OF THE INVENTION

Briefly stated, the present invention comprises a brake shoe assembly for vehicles such as cars, trucks, and the like. The brake shoe assembly includes an arcuate brake shoe table mounted to an arcuate web, the brake shoe table being provided with an outer attachment surface to which a brake shoe lining may be attached. Typically, the brake shoe table includes first and second distal edge retainer members which aid in retaining the brake shoe lining on the outer attachment surface of the table. Each of these distal edge retainer members are positioned such that they abut each respective distal edge of the brake shoe lining. So configured, the distal edge retainer members maintain the brake shoe lining in correct alignment on the brake shoe table, against the shear forces applied to the lining during vehicle braking. In addition, these distal edge retainer members protect the distal edges of the brake shoe lining against stress-related fracture to which these edges are prone. Typically, the distal edge retainer members are formed by bending back the distal ends of the brake shoe table such that distal flanges are created at either end of the brake shoe table. In the preferred embodiment, these flanges are bent to the point where they form acute angles with the outer attachment surface of the brake shoe table.

In addition to the distal edge retainer members, a central retainer member typically is positioned at a medial portion of the brake shoe lining. The central retainer member typically takes the form of a central wedge which lies between two brake shoe lining plates which form the brake shoe lining. This central wedge may be dove-tail shaped such that the beveled edges of the central wedge are in flush abutment with a beveled medial edge of each brake shoe lining plate. Arranged in this manner, the central wedge forces the brake shoe lining plates outward by into firm abutment with the distal flanges, so that each brake shoe lining plate is held in compression between the central wedge and the distal flanges. This compression provides for secure attachment of the brake shoe lining against the shear forces which can lead to detachment in conventional bonded brake shoe assemblies.

Thus, it is an object of this invention to provide a brake shoe assembly that is reinforced against the shear forces created during vehicle braking.

Another object of this invention is to provide a brake shoe assembly having distal edge retainer members, typically in the form of distal flanges, which maintain the brake shoe lining in proper position on the brake shoe table.

A further object of this invention is to provide a brake shoe assembly which includes a central retainer member, typically in the form of a central wedge, which when attached to the brake shoe table, forces the brake shoe lining plates outward by, into the distal flanges, so that each lining plate is held on the table in compression.

Other objects, features and advantages of the present invention, will become apparent upon reading the following detailed description, when taken in conjunction with the accompanying drawings.

DESCRIPTION OF THE PREFERRED EMBODIMENTS

Figure 1:
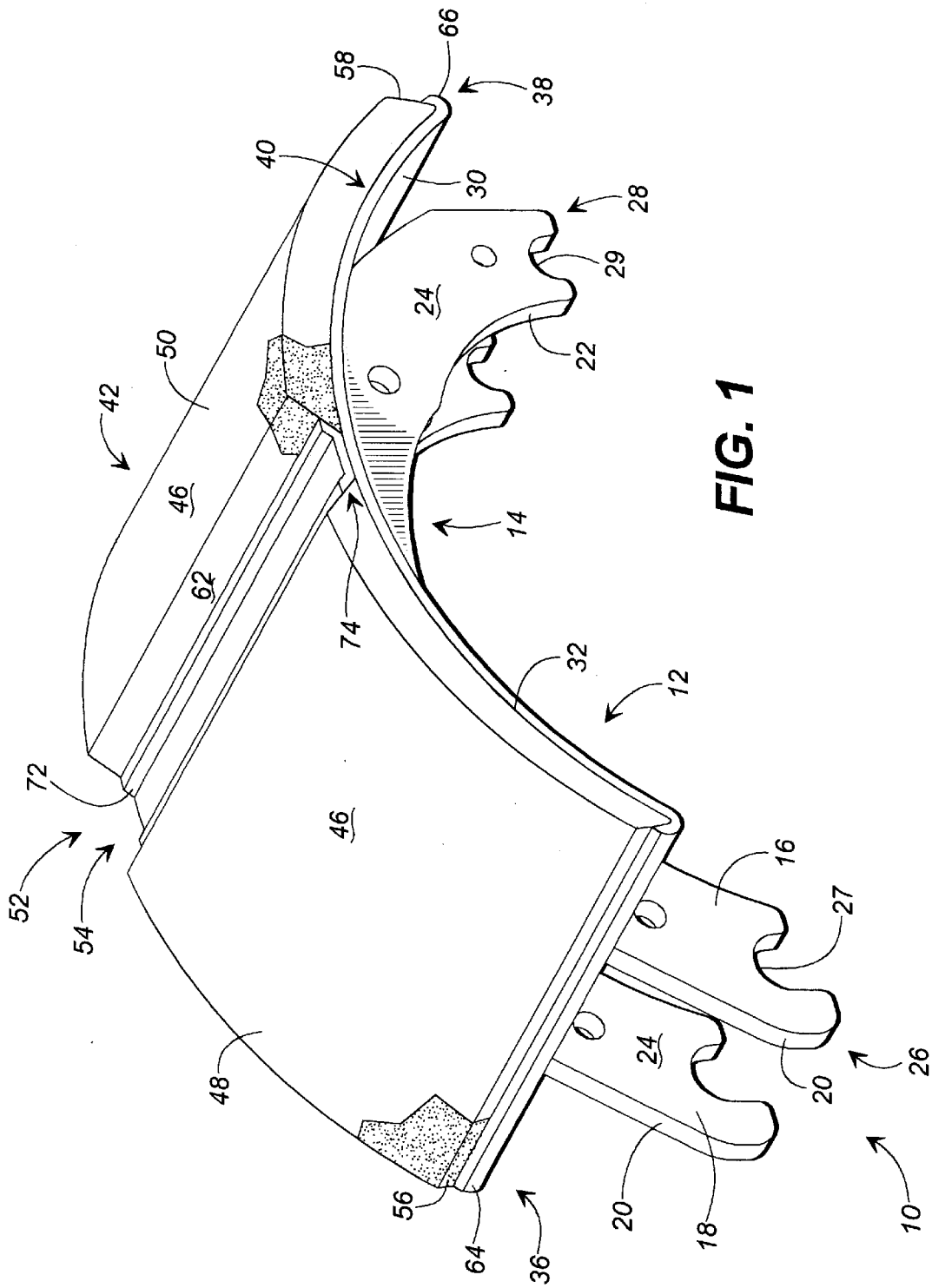
FIG. 1 is a perspective view of the brake shoe assembly having brake lining retainer members of the present invention.

Referring now in greater detail to the drawings in which like numerals indicate like parts throughout the several views, FIG. 1 illustrates, in perspective, the improved brake shoe assembly 10 for the wheels of vehicles such as cars, trucks, and the like. The brake shoe assembly comprises an arcuate brake shoe table 12 mounted to a similarly curved arcuate web 14, the arcuate brake shoe table being attached to the arcuate web in an overlapping manner. As depicted in FIG. 1, the arcuate web 14 typically includes a pair of arcuate struts 16 and 18, although it will be understood that a single strut can be used to form the web. Each strut 16 and 18 is fabricated from a high strength metal such as a high tensile strength steel and includes an outer convex edge 20, an inner concave edge 22, substantially flat side surfaces 24, and first and second ends 26 and 28. The curvature of each strut is formed about the predefined radius required to fit the desired braking assembly. Substantially semicircular notches 27 and 29 are formed at the first and second ends respectfully of the struts 16 and 18 for engaging an anchor pin and a roller of the braking assembly (not shown).

The brake shoe table 12 is mounted to the outer convex edges 20 of the struts 16 and 18 as by welding. As mentioned above, the brake shoe table is a generally rectangularly shaped plate formed from the same high tensile strength steel or similar high strength metal of which the struts are formed. The rectangular shape of the brake shoe table 12 is formed by two opposing sides 32 and 34 and distal ends 36 and 38. In addition, the brake shoe table 12 has an arcuate outer attachment surface 40 to which a brake shoe lining can be affixed. The brake shoe table 12 is curved about a radius that corresponds approximately to the radius of the web 14, the outer convex edge 20 of each strut 16 and 18 attached to an inner concave surface 30 of the table.

Figure 2:
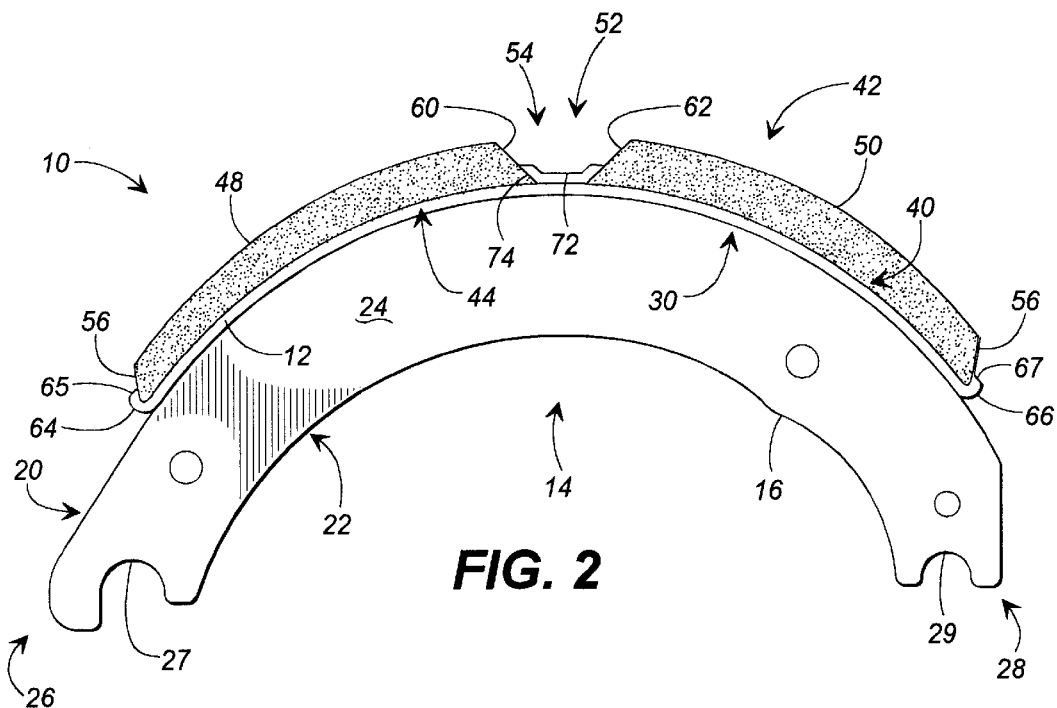
FIG. 2 is an side view of the brake shoe assembly showing the abutment of the retainer members and the brake shoe lining.

As illustrated in FIGS. 1–2, the brake shoe assembly 10 includes a brake shoe lining 42 mounted to the brake shoe table 12. This brake shoe lining can be formed from high strength frictional materials conventionally used in brake manufacture or any other material which could apply adequate frictional stopping force to a vehicle brake drum. The brake shoe lining 42 generally is arcuately shaped and is provided with an inner attachment surface 44 and an outer contact surface 46. The outer attachment surface 40 of the brake shoe table 12 is carefully formed with low tolerance to closely conform to the radius of curvature of the inner attachment surface 44 of the brake shoe lining 42 so that the table can flushly engage the lining with little, if any, gaps formed there between. Similarly, the outer contact surface 46 of the brake shoe lining 42 is formed with a radius of curvature which closely conforms to the radius of curvature of the inner friction surface of the brake drum with which the invention is used.

Figure 3:
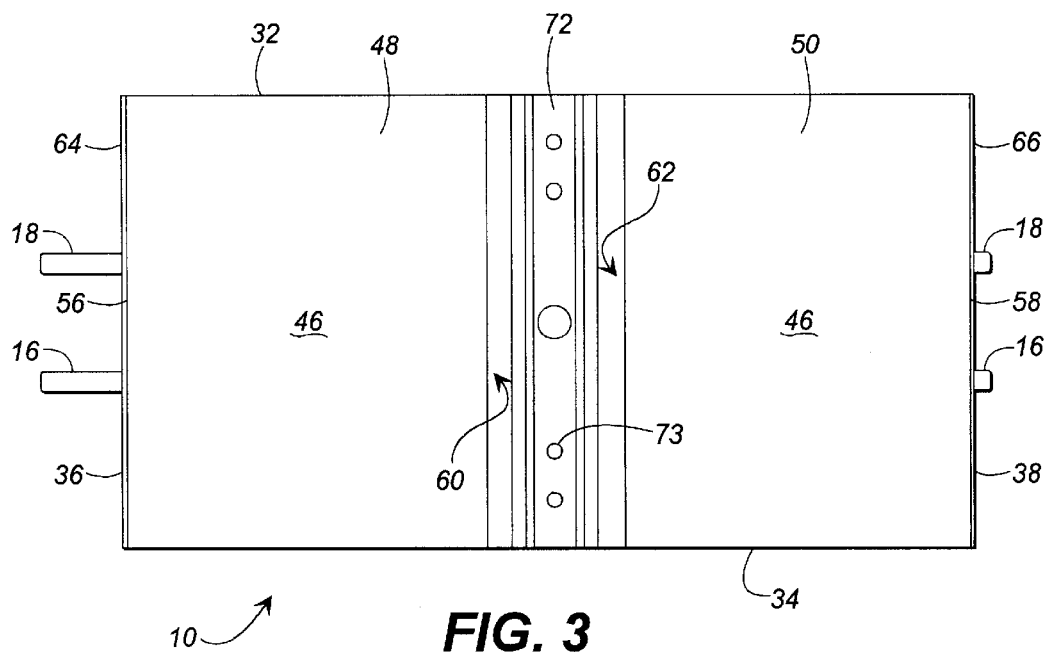
FIG. 3 is a plan view of the brake shoe assembly showing attachment of the central retainer member.

In the preferred embodiment, the brake shoe lining 42 comprises two individual brake shoe lining plates 48 and 50 which are to be mounted to the outer attachment surface 40 of the brake shoe table 12. As illustrated in FIGS. 1–3, the brake shoe lining plates 48 and 50 are positioned on the brake shoe table 12 in a spaced relationship. The space formed between the two brake shoe lining plates 48 and 50 constitutes a medial portion 52 of the entirety of the brake shoe lining 42. Substantially coinciding with the medial portion 52 is a medial area 54 of the brake shoe table 12. The brake shoe lining 42 may be said to be generally symmetrical about the medial portion 52 and the medial area 54 with the brake shoe lining plates disposed on opposite sides thereof. Although the preferred brake shoe lining comprises two separate brake shoe lining plates, it is to be understood that the brake shoe lining could be formed of a single continuous brake shoe lining plate which substantially overlies the entire brake shoe table.

Also depicted in FIGS. 1–2 are distal edges 56 and 58 formed on the brake shoe lining 42. In cases in which the brake shoe lining 42 is formed of two brake shoe lining plates 48 and 50, each of the plates is provided with a distal edge 56 and 58 respectively as indicated in FIGS. 1–2. Furthermore, the brake shoe lining plates 56 and 58 are provided with medial edges 60 and 62 respectively.

As illustrated most clearly in FIGS. 1–2, the distal ends 36 and 38 of the brake shoe table are provided with means for retaining the distal edges 56 and 58 of the brake shoe lining 42. In the preferred embodiment, these means take the form of distal edge retainer members 64 and 66 which extend along substantially the entire width of the brake shoe table 12. Each of the distal edge retainer members are created by bending the distal ends of the brake shoe table upwardly to form distal flanges. As shown in FIGS. 1–2, each of the brake shoe lining plates 48 and 50 abut one of the distal flanges 64 and 66 such that the distal edge of each plate is in flush abutment with one of the distal flanges.

Configured in this manner, the flanges support the brake shoe lining plates against the shear forces created by contact with the rotating friction surface of the brake drum. Since each end of the brake shoe table has a flange, this support is provided in both directions of rotation and is therefore effective when the brakes are applied while traveling forward or in reverse. In addition, the flanges protect the distal edges of the plates. Typically, the distal edges of conventional brake linings are susceptible to stress-related fracture. The distal flanges of the present invention reduce the likelihood of such fracture by enclosing a portion of the edges to provide support thereto.

Although the dimensions of the flanges 64 and 66 may be varied to suit the particular application, it is preferred that the flanges be configured in a low-profile manner to avoid contact between the flanges and the friction surface of the brake drum. In the typical automotive application, the flanges would extend approximately 0.25 inches outward from the outer attachment surface 40. In that conventional brake linings tend to disintegrate when thinner than 0.25 inches, there is no need to form the flanges with a smaller height dimension.

As with any brake assembly, it is advised that the brake assembly be inspected periodically to determine whether the lining plates are worn to the point of requiring replacement. If, however, the brake assembly is not inspected and the brake shoe lining plates wear to the point of allowing contact between the flanges and the drum friction surface, the flanges will create noise when the brakes are applied, indicating to the vehicle operator that new plates must be installed. Although continued contact between the flanges and the brake drum is not advised, it is believed that a moderate amount of contact between the flanges and brake drum will not permanently damage the drum in that the flanges are provided with substantially flat and smooth upper surfaces 65 and 67.

As illustrated in FIGS. 1–2, the distal edges 56 and 58 of the brake shoe lining plates 48 and 50 can be inwardly beveled, i.e., angled toward the medial area 54 of the brake shoe table 12 such that the distal edges 56 and 58 form acute angles with the outer attachment surface 40 of the table. The distal flanges 64 and 66 are similarly angled toward the medial area 54 of the brake shoe table 12, also forming acute angles with the outer attachment surface 40 and further in flush abutment with the beveled distal edges 56 and 58. In this angled or beveled arrangement, the right-angle corners conventionally provided on the brake shoe lining are removed. Absence of these right-angle corners further reduces the likelihood of brake shoe lining fracture.

Where the brake shoe lining 42 comprises two separate brake shoe lining plates 48 and 50, the medial area 54 of the brake shoe table 12 is provided with means for retaining the medial portion 52 of the brake shoe lining 42 in proper position on the brake shoe table 12. In the preferred embodiment these means include a central retainer member 72 which is firmly attached to the outer attachment surface 40 of the brake shoe table 12 and which extends along substantially the entire width of the brake shoe table 12. The central retainer member 72 may be bolted to the brake shoe table 12 with a plurality of bolts 73 as shown in FIG. 3. Although bolting is the preferred method of attachment, it will be understood that equivalent means of attachment such as riveting or welding may alternatively be used.

As shown in FIGS. 1–2, the medial edges 60 and 62 of each brake shoe lining plate 48 and 50 is inwardly beveled toward the centers of each respective plate. As with the distal edges, each medial edge 60 and 62 forms an acute angle with the outer attachment surface 46 of the brake shoe table 12. To accommodate the angled orientation of these beveled medial edges 60 and 62, the central retainer member 72 is configured in the form of a dovetail-shaped central wedge having outwardly beveled edges 74. Each beveled edge is angled to closely correspond to the angle of declination at which the beveled medial edges 60 and 62 form with the brake shoe table 12. In other words, the outwardly beveled edges 74 are angled at substantially the same angle at which the beveled medial edges 60 and 62 are angled. This orientation permits flush abutment between the central wedge and the brake shoe lining plates such that the central wedge retains the medial portion 52 of the brake shoe lining in correct alignment on the brake shoe table. Moreover, when the central wedge 72 is bolted or otherwise fastened into place on the brake shoe table 12, the outwardly beveled edges 74 are pressed firmly against the inwardly beveled medial edges 60 and 62 of the brake shoe lining plates 48 and 50, forcing the brake shoe lining plates outwardly and into firm abutment with the distal flanges 64 and 66 at the distal ends 36 and 38 of the brake shoe table 12. Once fully bolted to the outer attachment surface 44 of the brake shoe table 12, the brake shoe lining plates 48 and 50 are securely held in compression between the central wedge 72 and the distal flanges 64 and 66, greatly reducing the possibility of brake shoe lining detachment.

The preferred embodiment of the brake shoe assembly described above is preferably assembled in the following manner. First, the brake shoe table 12 and web struts 16 and 18 are shaped such that their respective radiuses of curvature closely correspond to one another. In addition, the brake shoe table 12 is shaped to closely correspond to the shape of the brake shoe lining 42. More specifically, the radius of curvature of the outer attachment surface 40 of the brake shoe table 12 is formed with a radius of curvature which is nearly identical to the radius of curvature of the inner attachment surface 44 of the brake shoe lining 42 such that the two components mate in a nearly perfectly flush manner. Once the brake shoe table 12 is properly shaped, the distal ends 36 and 38 of the table are bent backwardly, away from the direction of curvature of the brake shoe table, such that distal flanges 64 and 66 are formed to extend outwardly from the outer attachment surface 40 of the brake shoe table 12. As described above, the angle at which the distal ends are bent closely approximates the angle of declination of the distal edges of the brake shoe lining. Where the angle of declination of the lining is greater than zero, the flanges will form acute angles with the outer attachment surface.

Once the distal flanges are formed, the brake shoe table 12 is precisely reshaped to account for any deformation associated with the formation of the distal flanges 64 and 66 and to further ensure close conformity with the brake shoe lining. Next, the struts 16 and 18 are welded to the inner concave surface 30 of the brake shoe table 12 in a parallel manner.

After the welds have cooled, substantially the entire outer attachment surface of the brake shoe table 40 is provided with a thin coating of bonding material and the brake shoe lining plates 48 and 50 are placed in position on the brake shoe table 12, the distal edges 56 and 58 of the plates in flush abutment with the distal flanges 68 and 70.

Before the bonding material sets, the central wedge 72 is bolted onto the outer attachment surface 40 at the medial area 54 of the brake shoe table 12. Due to the inwardly beveled angulation of the medial edges 60 and 62 of the brake shoe lining plates and the outwardly beveled angulation of the central wedge 72, the tightening of the bolts 73 causes the wedge to force each brake shoe lining plate 48 and 50 outward into the distal flanges 64 and 66.

Once the entire assembly is constructed, it can be slowly brought up to a predetermined high temperature and then slowly cooled to allow the bonding material to properly cure, permanently bonding the lining plates to the table. Alternatively, instead of heating the assembly at the manufacturing site, the brake shoe assembly 10 may be directly installed into the selected vehicle and used in the conventional manner, the central wedge 72 and the distal flanges 64 and 66 retaining the brake shoe lining plates 48 and 50 in correct position on the brake shoe table 12. During such use, the assembly is automatically brought up to an adequate curing temperature with the heat produced from braking friction. Once the vehicle is parked, the brake shoe assembly may slowly cool, thus completing the curing process and permanently affixing the brake shoe lining plates in position on the brake shoe table. This second method of assembly curing provides a distinct advantage over the conventional bonding in that it allows for faster manufacture with reduced labor.

It will be understood that, although the distal flanges are described as being formed prior to attachment of the web struts, the flanges could be formed after the struts are attached. Similarly, although the above method specifies shaping the brake shoe table with low tolerance to closely conform to the brake shoe lining, the brake shoe lining itself may be machined in addition to or in exception to the brake shoe table to ensure such close conformance. Furthermore, although it is preferred that the brake shoe lining plates 48 and 50 are bonded to the brake shoe table, it will be understood that the plates may be riveted or bolted to the table. Moreover, the table may be provided with holes, even in situations in which the plates are to be bonded, to allow for either the riveting or bolting of replacement plates to the table after removal of worn or damaged original plates. It is to be further understood that even if the plates are riveted or bolted, the retainer members are still useful in retaining the plates and protecting them from fracture.

While the forgoing invention has been described in the form of a preferred embodiment, it will be understood by those skilled in the art that numerous modifications, variations, and changes, some of which are described above, can be made thereto without departure from the spirit and scope of the invention as set forth in the following claims.

I claim:

1. A method of forming a brake shoe assembly, the brake shoe assembly including an arcuate web and an arcuate brake shoe table mounted to said web, said brake shoe table having an outer attachment surface, a medial portion, and two distal ends, the brake shoe assembly further including two brake shoe lining plates, each of said brake shoe lining plates having a distal edge and a medial edge, the method comprising the steps of:

bending each of said distal ends of said brake shoe table upwardly to form distal flanges extending outwardly from said outer attachment surface;

applying a bonding material to said outer attachment surface of said brake shoe table;

placing said brake shoe lining plates on top of said outer attachment surface of said brake shoe table with said distal edge of each of said brake shoe lining plates in flush abutment with said respective distal flanges of said brake shoe table, said bonding material spread evenly between said brake shoe lining plates and said outer attachment surface to avoid the presence of air pockets therebetween; and attaching a wedge member to said medial portion of said brake shoe table in abutment with said medial edge of each of said brake shoe lining plates, said wedge member urging each of said brake shoe lining plates outwardly into said distal flanges such that each of said brake shoe lining plates is securely retained on said outer attachment surface between said wedge member and said distal flanges in compression.

2. The method of claim 1 wherein the distal ends of said brake shoe table are bent toward a medial portion of said brake shoe table such that said distal flanges form acute angles with said outer attachment surface.

3. The method of claim 1 wherein said brake assembly is installed on a vehicle such that heat generated through initial use of the brakes will cure said bonding material located between said brake shoe lining plates and said outer attachment surface.

4. A method of forming a brake shoe assembly, the brake shoe assembly including an arcuate web and an arcuate brake shoe table mounted to said web, said brake shoe table having an outer attachment surface, a medial portion, and two distal ends, the brake shoe assembly further including two brake shoe lining plates, each of said brake shoe lining plates having a distal edge and a medial edge, the method comprising the steps of:

bending each of said distal ends of said brake shoe table upwardly to form distal flanges extending outwardly from said outer attachment surface;

attaching said brake shoe lining plates to said outer attachment surface of said brake shoe table with said distal edge of each of said brake shoe lining plates in flush abutment with said respective distal flanges of said brake shoe table; and attaching a wedge member to said medial portion of said brake shoe table in abutment with said medial edge of each of said brake shoe lining plates, said wedge member urging each of said brake shoe lining plates outwardly into said distal flanges such that each of said brake shoe lining plates is securely retained on said outer attachment surface between said wedge member and said distal flanges in compression.

5. The method of claim 4 wherein the distal ends of said brake shoe table are bent toward a medial portion of said brake shoe table such that said distal flanges form acute angles with said outer attachment surface.

* * * * *